United States Patent [19]
Zenzefilis

[11] 3,974,329
[45] Aug. 10, 1976

[54] TRANSMISSION OF VIDEO PICTURES AT AUDIO FREQUENCIES

[76] Inventor: George E. Zenzefilis, 27 Los Vientos, Camarillo, Calif. 93010

[22] Filed: Apr. 18, 1975

[21] Appl. No.: 569,447

Related U.S. Application Data

[62] Division of Ser. No. 418,477, Nov. 23, 1973, Pat. No. 3,881,188, which is a division of Ser. No. 177,194, Aug. 9, 1971, abandoned.

[52] U.S. Cl. .................. 178/6.8; 178/DIG. 24; 179/15.55 T; 360/9; 360/32
[51] Int. Cl.² .................. H04N 5/79; G11B 5/012; G11B 19/26
[58] Field of Search ................. 179/15.55 T; 360/8, 360/9, 30, 32; 178/6.8, DIG. 24

[56] References Cited
UNITED STATES PATENTS

| | | | |
|---|---|---|---|
| 3,564,127 | 2/1971 | Sziklai | 360/9 |
| 3,683,111 | 8/1972 | Southworth | 360/9 |

*Primary Examiner*—Howard W. Britton
*Attorney, Agent, or Firm*—Henry M. Bissell

[57] ABSTRACT

Video pictures are taken by a standard television camera, and each frame (usually 1/30 of a second duration) is encoded on a magnetic storage disk rotating at a speed synchronous with the frame rate (1800 rpm for a 1/30 second frame), so that one frame is recorded during one rotation of the disk. The encoded disk is then rotated at a rate that permits the encoded magnetic transitions to be read or decoded at an audio frequency. The information thus obtained is transmitted over an audio frequency communication system, such as a telephone line, and is recorded on a second storage disk at the receiving end of the ransmission system, such as a telephone line, and is recorded on a secon storage disk at the receiving end of the transmission system, with the disk rotating at the same speed as the transmitting disk so that one frame is recorded for each revolution. Thereafter, the eceiving disk is rotated at a speed that will produce a satisfactory image on a television broadcast receiver or video monitor, preferably at 1/30 of a second per frame.

Successive pictures may be recorded each 1/30 of a second per frame and may be received at the slower receiving rate until the desired number of frames is received. Thereafter, successive pictures may be displayed by rotating the receiver disk at the higher speed, with the pick-up transducer moving from one line to the next at whatever speed is selected; for example, every 1/30th of a second. Novel mechanical apparatus and novel electronic circuits are disclosed to make possible this system. The pictures may be in black and white or in color.

10 Claims, 18 Drawing Figures

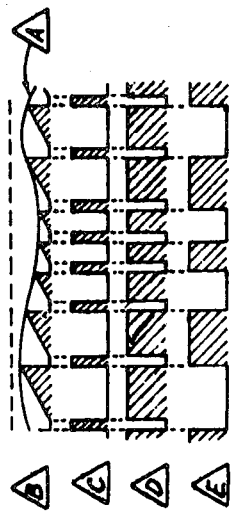
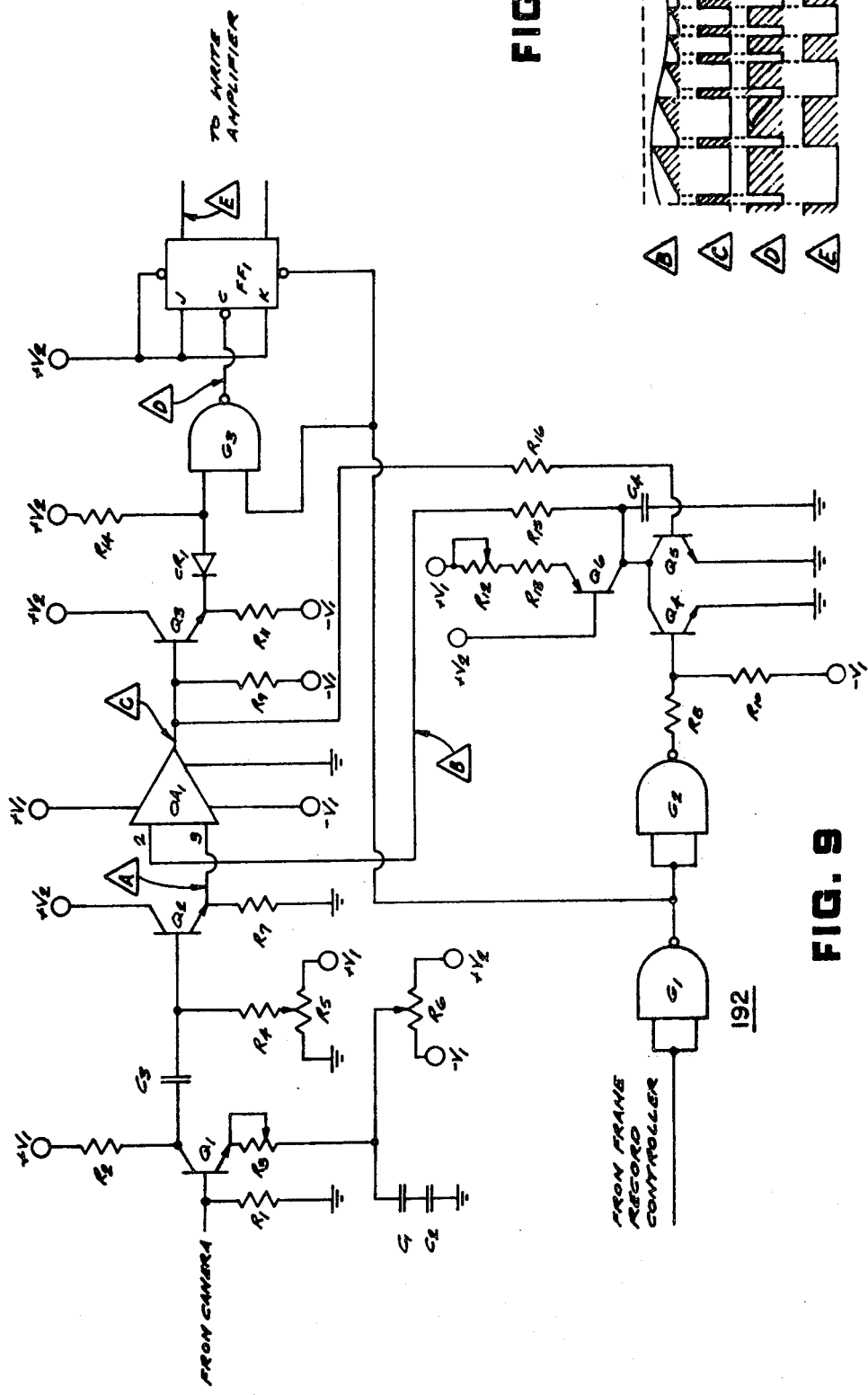
FIG. 9A
FIG. 9 ENCODER

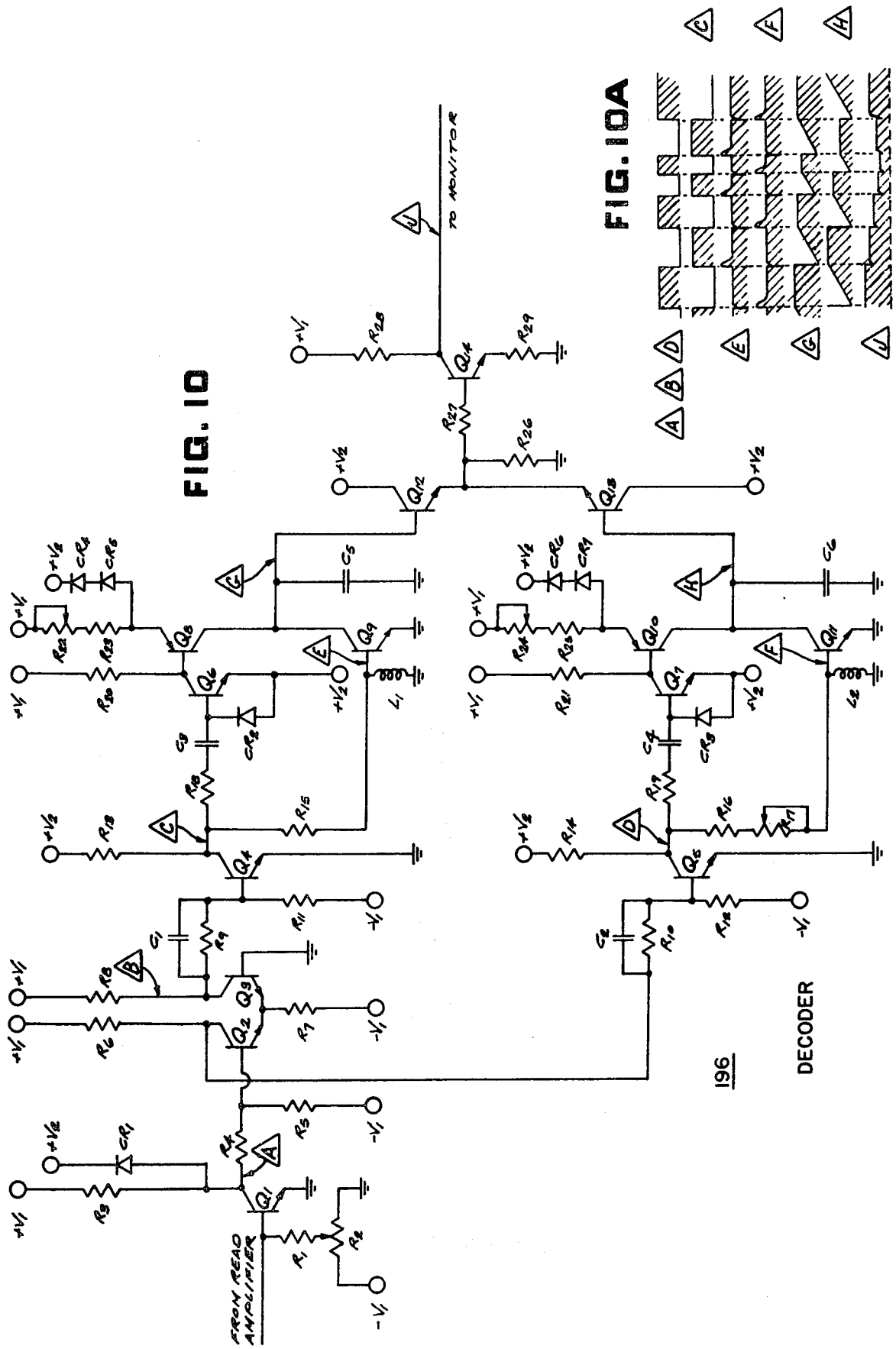

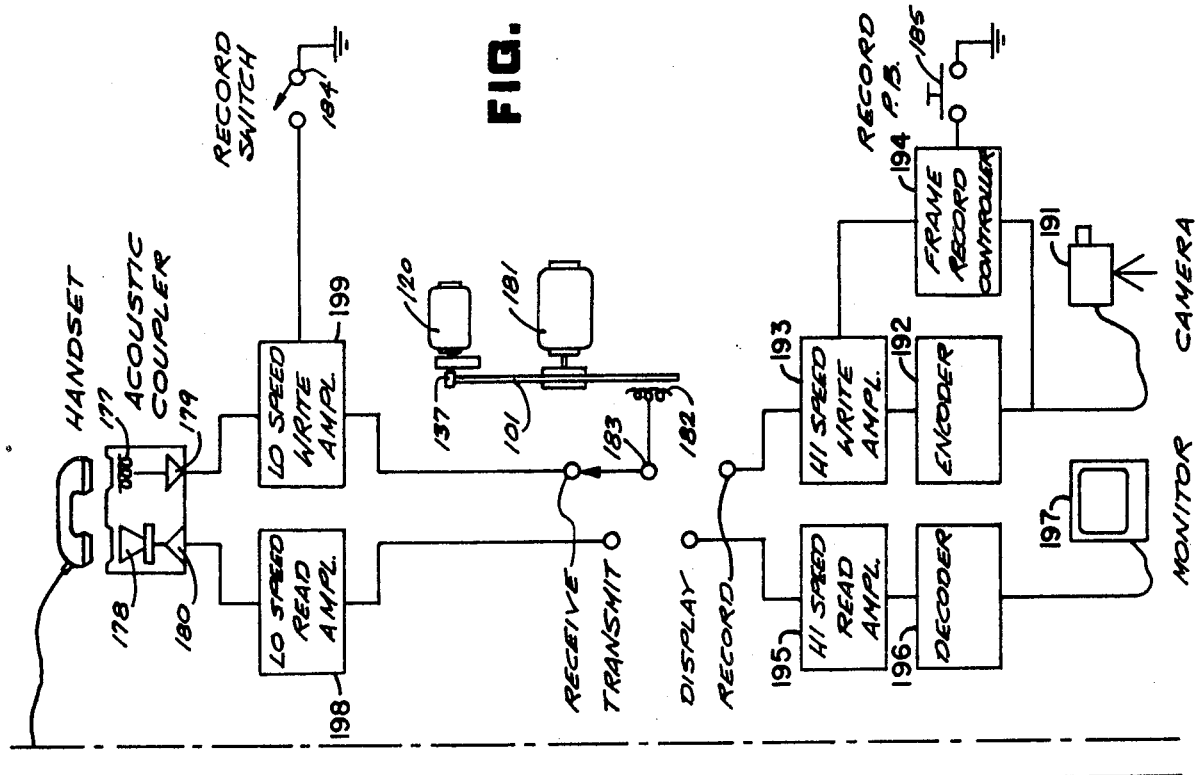
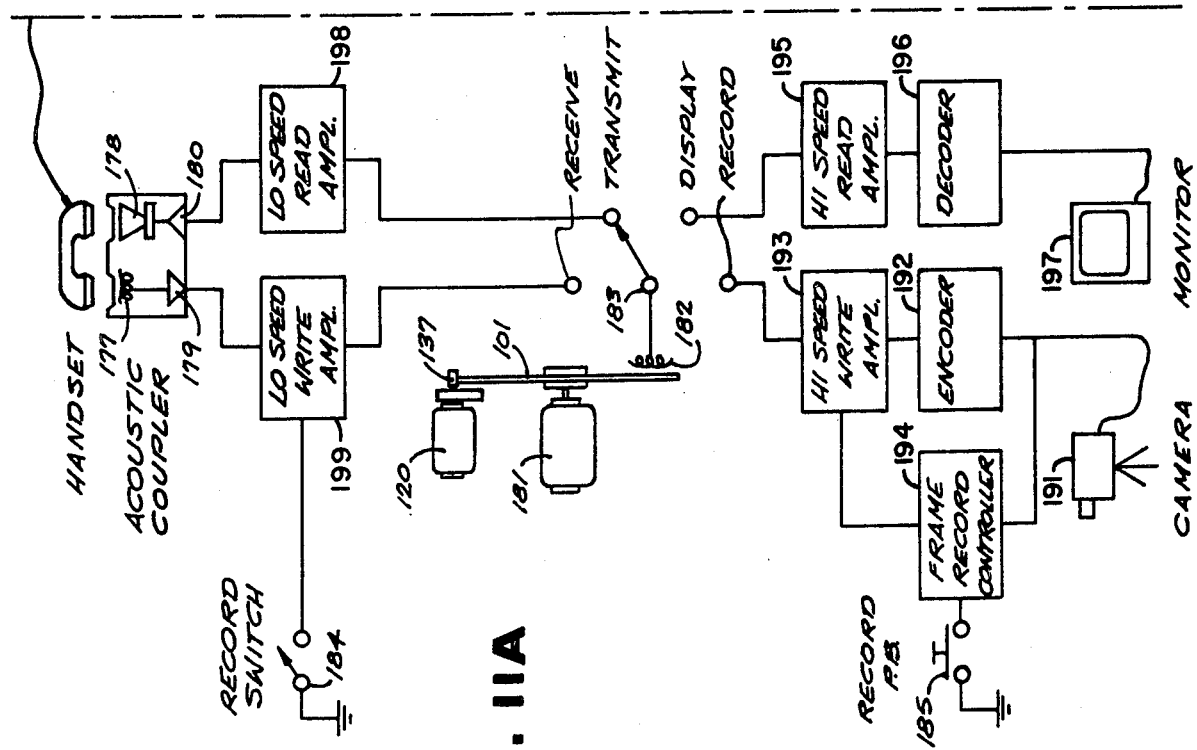

WRITE AMPLIFIER (LOW AND HIGH SPEED)

FRAME RECORD CONTROLLER

HIGH SPEED READ AMPLIFIER

TRANSMISSION OF VIDEO PICTURES AT AUDIO FREQUENCIES

CROSS-REFERENCE TO RELATED APPLICATION

This application is a division of co-pending application Ser. No. 418,477, filed Nov. 23, 1973 (now U.S. Pat. No. 3,881,188), which itself was a division of application Ser. No. 177,194, filed Aug. 9, 1971 (now abandoned).

DISCLOSURE

This invention provides a reliable method of transmitting single pictures in black and white, or in color, through ordinary telephone lines. The pictures are generated preferably by a standard television camera and are displayed on a standard television receiver, or more simply on a television signals monitor. The camera produces signals of large bandwidth which in the case of U.S. standards under FCC rules and recommendations is about 4.5MHz; similarly the television receiver, or monitor, receives the signals at a frequency bandwidth of 4.5MHz. However, the usual telephone line is limited to about 2,500Hz. Now, with the described invention the signals produced by the camera are slowed down to the rate required by the telephone line so that they can be transmitted well within telephone frequency limits (in fact, acoustic couplers may be used which do not require any electrical connection with the telephone), and after transmittal they are speeded up to their original rate and then are displayed normally on a video screen. The invention adapts itself to standard units commercially available, and may be practiced using a standard video camera, standard telephone mouth pieces, head phones and transmissions lines, and the pictures may be displayed on standard television broadcast receivers or commercial monitors.

This change of information rate is accomplished by recording the signals magnetically of each television frame to be transmitted, on a standard 14 in. disk rotating at 1800 rpm and in the form of a closed circular track. Then after the recording is completed, the disk is slowed down approximately 2,500 times, thus reducing the bandwidth of the reproduced signal to 1,800 Hz, so that the signals read off from the disk can be transmitted through the telephone line. The telephone transmission time is about 1½ minutes. The signals received at the other end of the telephone line are similarly recorded on an equally slowly rotating disk, identical in all respects with the disk at the transmitting end. As a matter of fact, since each picture occupies a single track, in one revolution of the slowly rotating disks one picture is transmitted and received. Immediately after a picture is received the disk at the receiving end may be speeded up to its normal angular velocity and the signals read off it are displayed by a monitor or television receiver showing continuously a television picture in still form. Since the picture occupies one closed circular track, as the disk rotates at 30 revolutions per second it displays 30 pictures per second, thus conforming to the framing requirements of the monitor. The system permits the transmittion of a picture of good resolution every 1½ minutes, so that many pictures may be transmitted in a short period of time.

One advantage of this method lies in the fact that a permanent record may be retained both at the receiving and at the transmitting end. An additional advantage is the fact that during transmission lower or higher rotational disk speeds can be used to accommodate to telephone systems having ability to transmit information at slower rates, or faster rates. A still further advantage is the ability to utilize additional circular tracks, in fact a great number of them, so that a long sequence of picutures can be recorded rapidly on the disk and transmitted slowly and automatically, without human intervention. Another important advantage is the fact that the subject's picture is recorded in 1/30 of a second and thus the subject need not stand still for the whole duration of transmission.

Two conversing persons can transmit to each other picures of themselves, documents can be sent faster than Post Office delivery, signatures can be transmitted for identification purposes, medical pictures of various kinds, such as X-rays or electrocardiograms, can be quickly transmitted from one location to another, investigating agencies can use this method to help locate lost or missing persons, wanted or even suspected persons. Pictures of fingerprints can also be transmitted efficiently. Copies of various articles or book pages can be transmitted directly, and from libraries; in fact, the newspaper of the future can be delivered at home in this manner. Drawings and any other information may be transmitted.

GENERAL DESCRIPTION

In order for the system to produce commercially acceptable results, several basic requirements must be met:

A. The slowly rotating disks, either during transmission or reception, must rotate very uniformly without angular velocity variations or perturbations.

B. Vibrations must be minimized in the machine structures, or on the disk, or on the recording or reading head, during the slow speed operation. This implies that the disk motor must be very efficiently isolated so that its unavoidable vibrations are not transmitted into the sensitive parts of the machine.

C. The recording and reading circuitry must be able to operate effectively at very low speeds, at which speeds the signals emerging from the reading transducer are extremely low in amplitude. This requirement imposes a high degree of electrical isolation from other sources of electromagnetic interference.

The structures of the present invention which have been devised satisfy these requirements above and are as follows:

At the low speed operation, the disk speed is made uniform by the usage of friction drive belts in all the reduction stages except the last one. However, in the first reduction stage a special inertia wheel is used which rotates on ball bearings freely around the shaft of the motor used to drive the disk. This wheel effectively isolates the rotary vibrations, or other variations of angular velocity of the stated motor from being transmitted to the belts. Additionally, this flywheel incorporates a coupler, such as a lossy rubber grommet, which damps and absorbs the residual rotary vibrations. Another means of further decoupling the motor, not shown in the drawings, is to mount the flywheel separate from the motor and couple it with the motor by means of a flexible shaft. Also, the final reduction stage is accomplished by engaging directly on the rim of the disk an interposer wheel or "puck" which connects the driving spindle to the disk; or in another preferred version, by engaging directly the rim of the disk with the last cylindrical member of the speed reduction mechanism, which will be referred to hereafter as "capstan." The reason for doing this is that the disks can easily be machined with a diameter tolerance of less than 0.010 in., which, compared with their large diameter, results in an excellent reduction member. Thus, the puck, or the capstan, are made all of a reasonably rigid material, such as metal, and their cylindrical surfaces are processed especially to increase its coefficient of friction by peening followed by polishing. Therefore, during the operation of picture transmission there will be no slippage between spindle and puck and puck and disk, or between capstan and disk. It should be pointed out that a resilient puck or capstan, such as a wheel lined with rubber, is not desirable because it can introduce variations of radius which will result in disk speed variations.

The translationary vibrations, that is the vibrations other than the type described above, are effectively isolated from the disk by using the following stratagem: All belts are disposed so that their axes, that is the lines passing through the centers of the driving and driven pulleys, intersect at 90°. Since for small amplitudes of vibrations the disturbances are transmitted only in the direction of the belt axis, it is evident that any vibrations transmitted through the axis of the belt accomplishing the first reduction, cannot be transmitted through the second belt, which accomplishes the second reduction. Another stratagem utilized is the fact that the slow speed motor drive is suspended by rubber mounts where the rubber is in shear, thus, the slow speed drive motor cannot transmit its unavoidable vibrations to the frame of the machine. Still a further stratagem is the suspension of a heavy mass on the mechanism incorporating all the motion reductions, which results in a lower natural frequency than the expected frequency of vibrations.

For obtaining a satisfactory reading of the disks at slow speeds, the following three schemes are used: First, the head stays in contact with the disk and thus it can operate at minute tangential velocities at which the voltages emerging from the transducer are proportionately very small. Second, a special frequency modulation encoding means, achieved by a process of pseudo-random sampling of the television signal, is used when recording on the disk at high speed in order to achieve immunity from the unavoidable telephone transmission inadequacies and also in order to permit reading at very low speeds. This encoding means also removes the carrier and the lower half of the frequency sidebands and thus provides the maximum efficiency in recording. Third, advantage is taken of the fact that the bandwidth of the emerging signals is proportionately very small. In fact, experience shows that good pictures can be transmitted using an encoding scheme which at low disk speeds yields a signal having a band between about 250 Hz and about 2.3KHz. Therefore, an amplifier is used which incorporates filters reducing the bandwidth considerably.

TRANSDUCER

Since the disk is slowed down approximately 2,500 times from its normal angular velocity, and since for purposes of simplicity it is desired that the same transducer read the recording at the low speed, the transducer is in contact with the disk during the slow speed operation and thus it is not dependent on any aerodynamic balancing conditions. The signals therefore produced by the transducer are of the same nature as when a disk is rotated at a high speed, except that they are drastically reduced in amplitude.

The amplifier uses common mode rejection stages of amplification in cascade and seeks to detect the occurrence of the magnetic transitions recorded on the disk. For this the derivative of the transducer signal is produced immediately after the first stage before signal saturation can occur, by means of a capacitor-resistor network. Also, a transformer is introduced coupling the head to the first stage of amplification which results in a higher head voltage.

Finally, each stage of amplification has its bandwidth heavily reduced so that it can only amplify from about 250 Hz to about 3.0KHz.

DISK

The recorded signals on the disk produced by the special encoding means mentioned above are in the form of saturated magnetic transitions. The signal waveform from the camera corresponding to the picture to be recorded at high speed is sampled by a voltage which increases proportionately to time and which therefore is in the form of a ramp having a constant slope. When any one ramp becomes equal to the instantaneous voltage of the signal being sampled, it stops and then it restarts; simultaneously the recording amplifier reverses the direction of the current flowing in the head and, hence, it produces a saturated magnetic transition. It follows that the transitions are closely spaced if the signal being sampled is of low amplitude, and farther apart if it is of higher amplitude. Since the time occurrence of the next transition depends on the voltage of the television picture, usually unpredictable in nature, it is evident that the transitions placed on the disk are of random spacing; however, not completely so since the position of each is directly dependent upon the nature of the sampled signal. This method was devised because of the simplicity of its implementation, since during the low speed reading the transitions are detected from one disk and duplicated on the other, on a one-to-one correspondence without the incorporation of tuned filters normally associated with FM. Furthermore, during the high speed reading, no frequency or time standards, such as clock tracks or auxiliary generators, are needed.

A magnetic recording was chosen because it permits an infinitely large number of repeated disk recordings without significant wear, since the disk functions merely as the intermediary medium to hold the picture until it is transmitted and displayed.

Various objects, advantages and features of the invention will be apparent in the foregoing description and the following description and claims, together with the drawings forming an integral part of this specification, and in which:

FIG. 9 is a schematic diagram of the electronic circuit for converting the undulating wave output of a TV camera to a square wave pattern that can be encoded on a data disk.

FIG. 9A is a graph of the waveforms at indicated portions in the circuit of FIG. 9.

FIG. 10 is a schematic diagram of the decoder circuit forming a part of the invention, wherein the square waves from the data disk are converted back into an undulating wave which can drive a TV monitor to show a TV picture.

FIG. 10A is a diagram of the waveforms at indicated places in the decoder circuit of FIG. 10.

FIG. 11A is a schematic diagram of the various electronic circuits and mechanical parts of apparatus embodying the invention, showing a complete unit which can both transmit or receive TV pictures.

FIG. 11B is a schematic diagram of apparatus and circuits identical to that of FIG. 11A, and is capable of both transmitting and receiving, and is displayed herein to show the different functions when the unit of 11A and the unit of FIG. 11B receives pictures.

FIG. 15 is a graph of the wave forms which occur at various places in the high speed read amplifier of FIG. 14.

GENERAL SYSTEM CONFIGURATION

Figure 1:
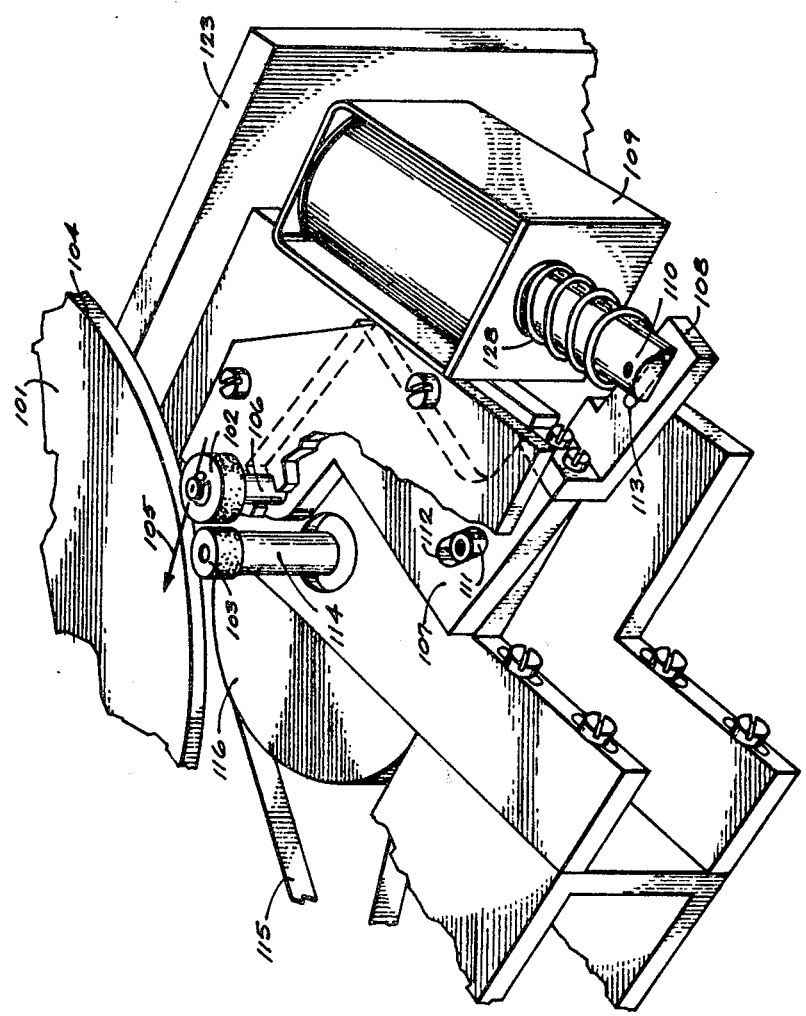
FIG. 1 is a fragmentary three-dimensional view of a part of the mechical system of the invention showing the slow speed drive of a data disk, wherein a movable puck engages the rim of a data disk and, in turn, is driven by a rotating wheel.

A general and simplified configuration of a system which embodies the invention is shown in FIGS. 11A and 11B. Each figure shows an identical unit consisting of mechanical apparatus and several electronic circuits. Each unit can transmit or receive pictures. The function to be performed by either may be selected by means of a switch 183. The switch is shown as having four consecutive positions: record, display, transmit and receive.

Each identical unit of FIGS. 11A and 11B includes a data disk or storage disk 101 rotated by a high speed motor 181 or alternatively by a low speed motor 120 geared down to rotate a capstan 137 which engages the rim of the disk 101. A read/write transducer or heat 182 magnetizes discrete areas of the disk along a track with alternating plus and minus polarity and of selected lengths. Although the details are not shown, the high speed motor 181 is turned on only when switch 183 is at the record and display modes and the slow speed motor 120 is turned only when the switch is at the transmit and receive modes.

Observing now FIG. 11A here is a typical sequence of operation which will serve as an example.

1. The switch 183 is turned to the record mode, the disk 101 rotates at high speed, and the transducer 182 is connected to the circuitry of a camera 191. The camera generates the video information in the form of a sequence of frames, each requiring 1/30 of a second. This information from the camera is processed by the encoder amplifier 192 which in turn feeds the high speed write amplifier 193. When the user is ready he presses once the record push button 185 activating the frame record controller 194 whose function is to turn on the high speed write amplifier 193 for one frame only. Thus only one frame is recorded on the disk.

2. Now the user turns switch 183 to the display position. This connects the transducer 182 to a high speed read amplifier 195 which in turn feeds a decoder amplifier 196. Since the disk rotates continuously at 30 revolutions per second a monitor 197 receives an endless sequence of the same frame at the rate of 30 frames per second, as required, and displays the information in the usual television form. If the picture is not satisfactory, switch 183 is returned to the record position and the sequence of paragraph 1 above is repeated. The new recording automatically erases the old picture in the process.

3. When the user decides to transmit the picture being displayed, he turns the switch 183 to the transmit mode. This action, by circuitry which is not shown, brings rapidly to a stop the main motor 181 by means of electrical braking, disconnects it and immediately afterward turns on the slow speed motor 120 and engages the capstan 137 on the disk's edge. Also, switch 183 connects the transducer 182 to the acoustic speaker 178 of the coupler. A low speed read amplifier 198 processes the signals from the telephone transducer continuously. The burden of starting and ending the recording is reserved for the action of the system in the receive mode.

4. Simultaneously with placing the apparatus of FIG. 11A in the transmit mode, the apparatus of FIG. 11B is placed in the receive mode. This can be done automatically with proper advance signals or can be done by an operator who is in telephone communication with the user of the apparatus of FIG. 11A. To place the system of FIG. 11B in the receive mode, switch 183 is turned to the corresponding position, which action also brings the disk rapidly to a stop as previously described (if it has previously been rotating), turns on the slow speed motor 120, and engages the capstan 137 on the disk's edge. Now a low speed write amplifier 199 connects the transducer 182 with the induction coil or microphone 177 of the acoustic coupler and the system is ready to record a complete frame. For this, the user simply turns on a record switch 184 for the duration of one frame, which action energizes the write amplifier 199. The beginning and ending of every frame is audibly distinguisable because the picture is automatically black and the disk of FIG. 11A is impressed with transition that give a sound resembling a bugle's tone. At this stage an automatic sequencing mechanism (not shown) may be activated which introduces also the necessary interlocks, so that all mechanical actions take place safely with a minimum of the user's attention. For example, the record switch 184 can be activated by well-known sound pitch detectors, the slow speed mechanism disengaged and the main motor turned automatically. Also, the mode switch 183 can be turned automatically to position display, thus making the reception more practical and pleasing. The record switch 184 must be closed at the beginning of the received frame and must be opened at the end, thus enabling the low speed write amplifier 199 to record a single picture without any overlapping or gap excepting a minor gap or a minor overlap due to the unavoidable and slight differences in the speeds of the transmitting and receiving disk. This is easily handled by an operator because the disk rotates slowly and receiving takes about a minute and a half. However, if the recording starts to the beginning of the frame and ends at the end of the frame the monitor will be able to display the picture reasonably well because the overlap or the gap will occur at the undisplayed portion of the picture and thus it will not disturb the monitors' synchronizing circuits. At the termination of the recording the user will position the switch 183 at the display mode, speed up the disk, and thus display the received picture on the monitor. The preferred way of receiving the acoustic information from the handset is by means of speaker 178. The amplifiers 179 and 180 serve to locally amplify the information received by the acoustic coupler or generated by it. All the block diagrams will be described at length in later paragraphs with the exception of the linear amplifiers 179 and 180 in the acoustic couplers, since they are very orthodox and those versed in the art of electronics are familiar with their design.

MECHANICAL APPARATUS

The foregoing operations cannot be successfully completed unless the mechanical apparatus is carefully designed to minimize all vibrations, angular oscillations and irregularities of movement. The mechanical apparatus for high speed operation has heretofore been disclosed in my copending patent application Ser. No. 23,289 filed Mar. 23, 1970 entitled METHOD AND APPARATUS FOR RECORDING AND REPRODUCING VIDEO, now U.S. Pat. No. 3,701,846, issued Oct. 31, 1972, and, hence, will not be described here. That same application also shows a satisfactory construction for a read/write transducer. One apparatus for moving a read/write transducer or head over the surface of a data disk is disclosed in my U.S. Pat. No. 3,474,687 issued Oct. 28, 1969, entitled LEVER TRAIN ACTUATOR and, hence, is not described herein.

The mechanical structure for low speed operation is described herein and is based on my discovery that a rim drive for a data disk will operate most satisfactorily if there is metal-to-metal contact between an accurately finished metal rim and an accurately machined and journaled capstan.

Referring to FIG. 1, the disk 101 rotates circularly during the slow speed mode by means of an interposing wheel or puck 102 which contacts simultaneously a spindle 103 and the rim 104 of the disk 101. The interposer 102 is able to move out of engagement during the normal operation of the machine when the disk 101 moves at high velocity, and only moves into engagement by moving along the direction of the arrow 105, as shown, after the disk has come to a stop. The interposer 102 rotates freely on a shaft 106 which is rigidly connected to a lever 107 and which lever by means of an extension piece 108, which is engaged to the plunger 110 of a solenoid 109, is permitted to rotate around pivot 111 thus forcing the interposer into engagement. The lever 107 has two rectilinear slots, 112 and 113, both shown more clearly on FIG. 2. Slot 112 permits the interposer wheel 102 to accommodate variations in the radius and location of disk 101 and spindle 103, while it moves in the direction of engagement 105. Slot 113 accommodates the coupling of solenoid plunger 110 and lever 107, since the first is moving rectilinearly and the latter essentially pivotally.

Figure 2:
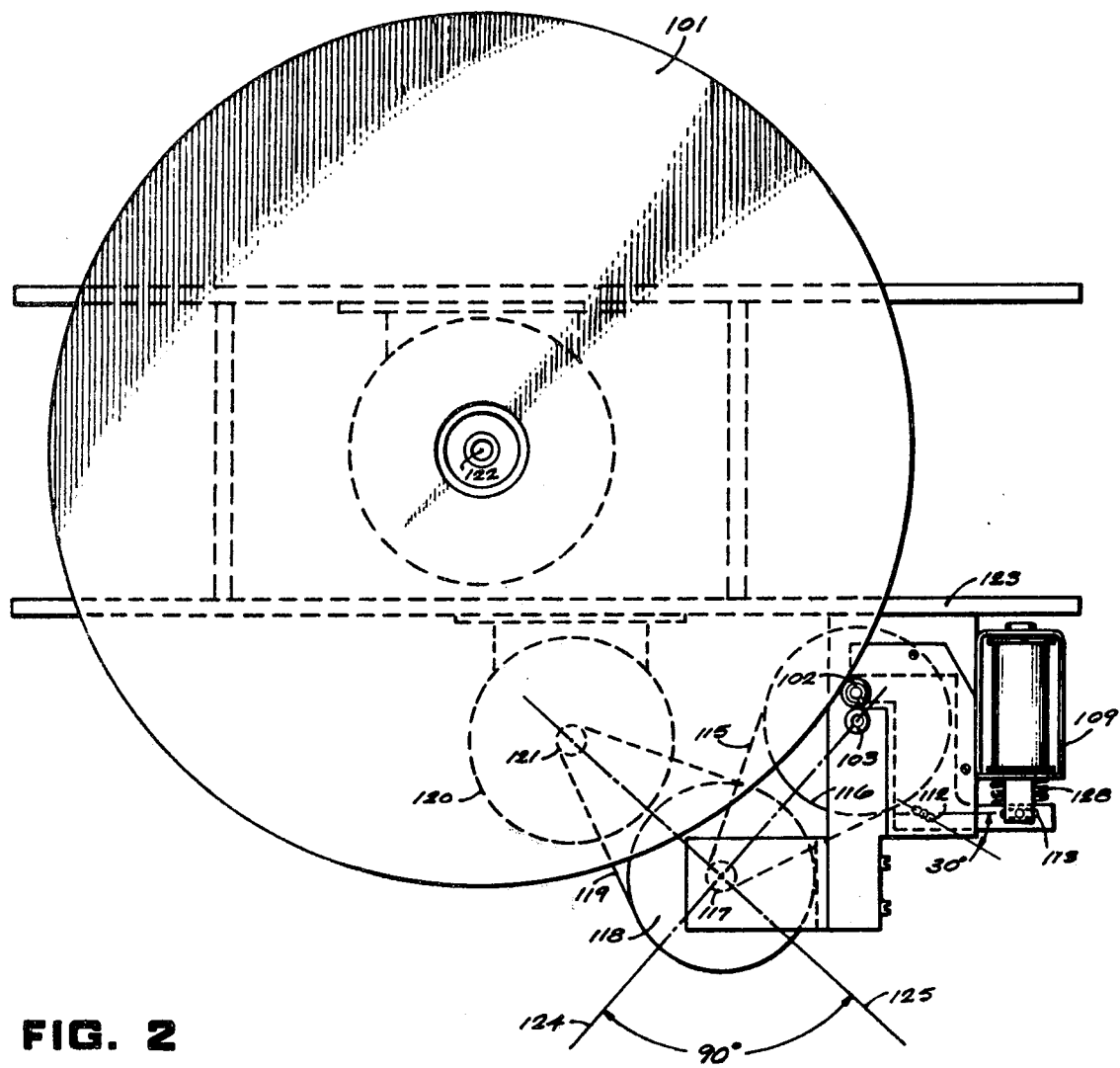
FIG. 2 is a plan view of the apparatus of FIG 1, showing the entire data disk.

Referring now to both FIGS. 1 and 2, a crowned pulley 116 forms a single body with the cylindrical spindle 103, by means of an extension shaft 114, and it receives its circular motion by means of a belt 115. In turn the belt 115 is driven by a cylindrical pulley 117 which is rigidly connected to the crowned pulley 118. In turn pulley 118 receives its rotary motion by means of a belt 119 which is being driven by the slow speed motor 120 and cylindrical pulley 121. Now, axes 124 and 125 of the belts 119 and 115 respectively, form an angle of approximately 90° with each other in order to isolate the unavoidable vibrations generated by motor 120, shown more clearly on FIG. 3, from being transmitted to the spindle 103, because each belt can transmit vibrations along its axis and not in a direction perpendicular to it. At the same time the motor 120 is isolated from a structure plate 123, on which everything is mounted, by means of rubber mounting blocks 126 and 127, FIG. 3. Referring now to FIG. 2, solenoid 109, mounted on the structure plate 123 by means of an attachment not shown, provides the engagement force when energized, and compression spring 128 provides the disengagement force when the solenoid is deenergized. The rubber of mounts 126 and 127 is in shear.

Figure 3:
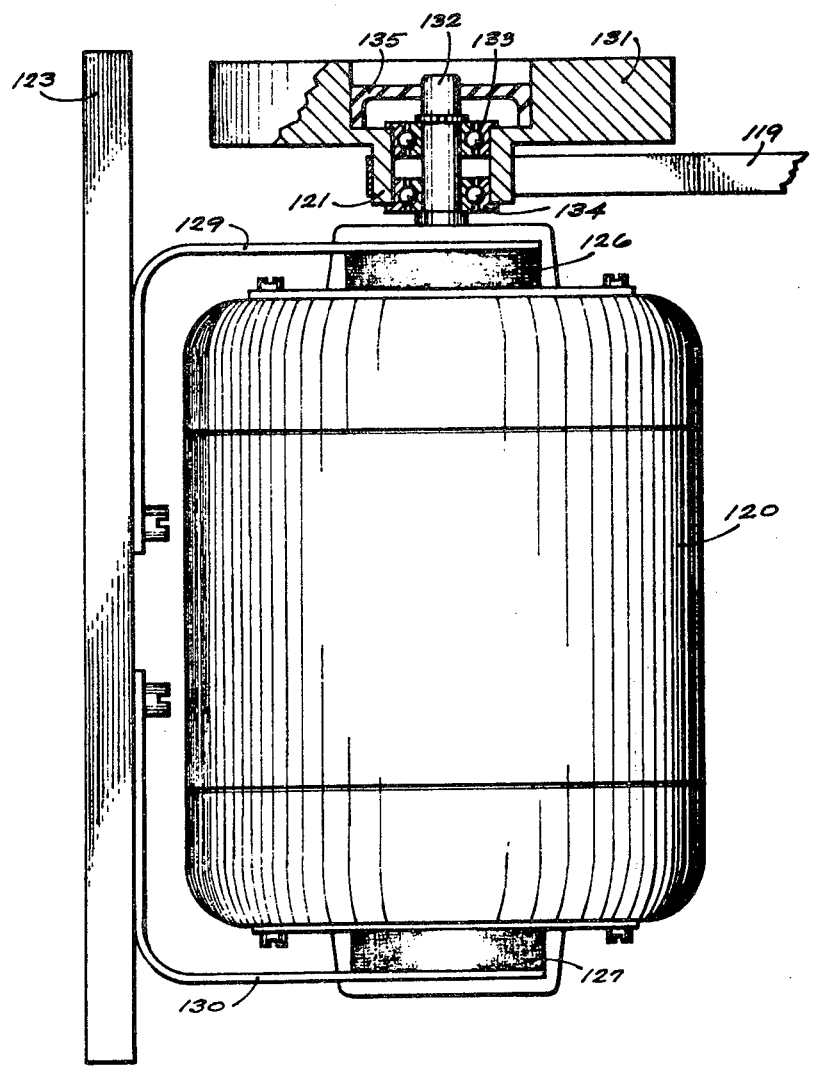
FIG. 3 is an elevation view, partly in section, showing the mounting of the slow speed drive motor, wherein rubber placed in shear absorbs vibrations of the motor.

In FIG. 3 the slow speed motor 120 is shown mounted on the structure plate 123 by means of the mounting brackets 129 and 130. On the same figure there is shown a flywheel 131 rotating freely on a motor shaft 132 by means of ball bearings 133 and 134. A lossy rubber grommet 135 couples the flywheel with the motor shaft so that the rotational vibrations of the motor resulting in angular accelerations or decelerations will be absorbed by the grommet. A "lossy" material is one that is resilient without elastic rebound. Also on the same figure is shown more clearly the first stage driving pulley 121 and the first belt 119.

Figure 4:
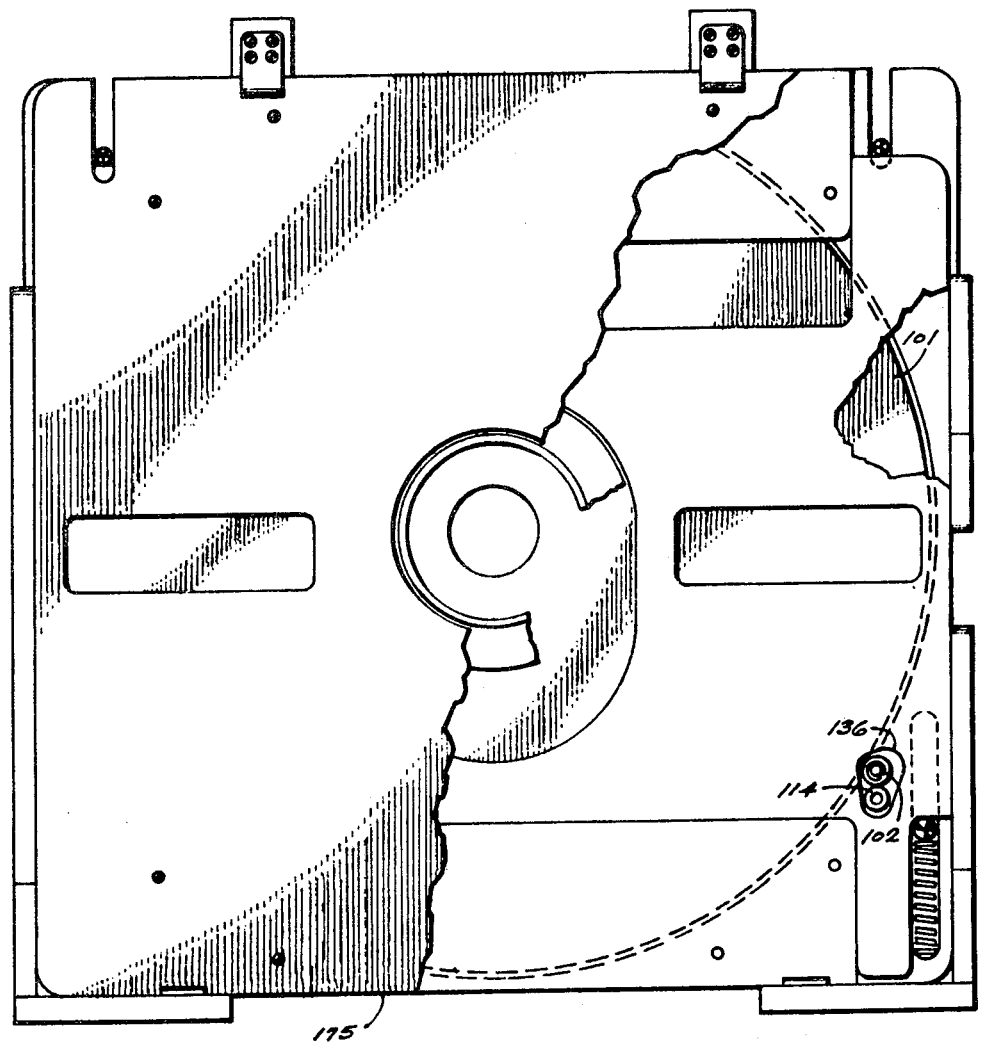
FIG. 4 is a plan view, with portions broken away, of a protective cassette which covers the data disk and has an aperture cut therein to receive the driving puck and the wheel which drives the puck.

In FIG. 4 the data disk 101 is shown encased in a cassette 175, which cassette efficiently covers and protects the disk during loading and unloading in the instances that the disk must be replaced, because the unavoidable handling otherwise by human hands will leave greasy spots on the disk's cylindrical surface, which spots will cause slippage between the puck and the disk, or between the capstan and the disk (when a capstan is used as described below) by grease transferral. The details of the cassette are described in my copending United States patent application, Ser. No. 816,874 filed Mar. 19, 1969, now U.S. Pat. No. 3,609,722, issued Sept. 28, 1971. In the same figure the puck 102 and driving spindle 114 are clearly shown as entering and engaging the disk through a hole.

DIRECT CAPSTAN DRIVE

Figure 5:
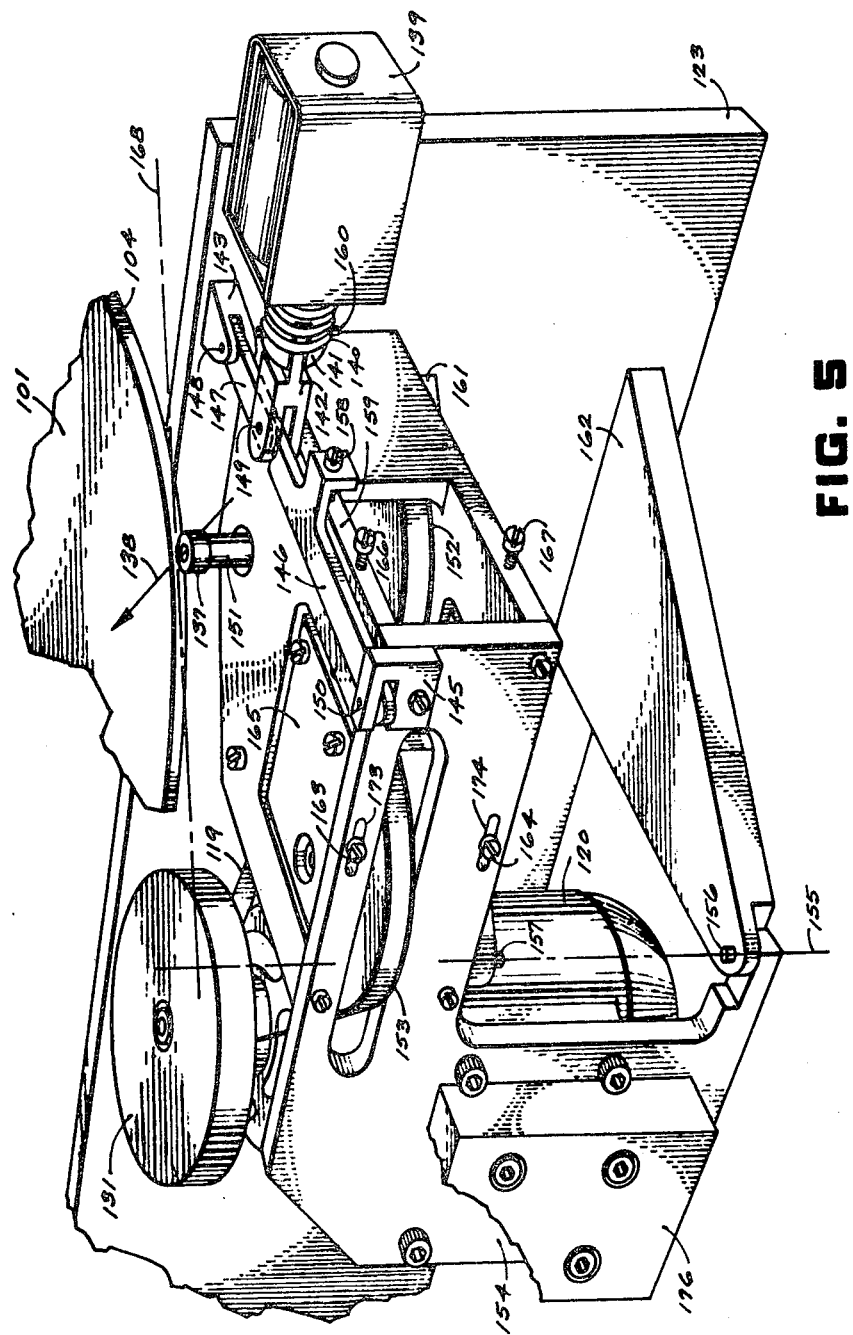
FIG. 5 is a three-dimensional view of another preferred form of slow speed drive for the data disk, wherein a single wheel directly engages the rim of the data disk.

On FIG. 5 the other preferred version of the invention is shown in which the complete mechanism, comprising a slow speed driving motor 120, a first reduction assembly 165 and a second reduction assembly 159, is mounted on a plate 154. There by means of a pivoting action, plate 154 can swing around axis 155, so that the last cylindrical member of the reduction chain, or capstan 137, can contact the disk 101 by moving in the direction of the arrow 138. The axis 155 lies on the tangent plane to the disk at the point of capstan contact, a horizontal line of which is 168, therefore the capstan moves in a direction perpendicular to the disk's rim.

Figure 6:
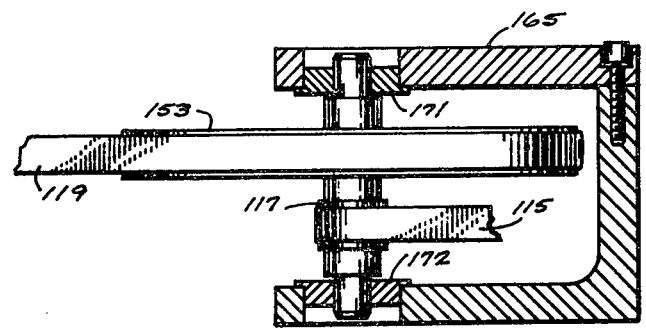
FIG. 6 is an elevation view, partly in section, of an intermediary set of pulleys in the belt drive of the mechanism of FIG. 5.

On FIG. 6 the first reduction assembly is more clearly shown. Belt 119 drives the crowned pulley 153 which is rigidly connected to the cylindrical driver pulley 117. The assembly turns freely on bearings 171 and 172. It was found by experience that sintered bronze or solid brass bearings are the most suitable because ball bearings introduce noises.

Figure 7:
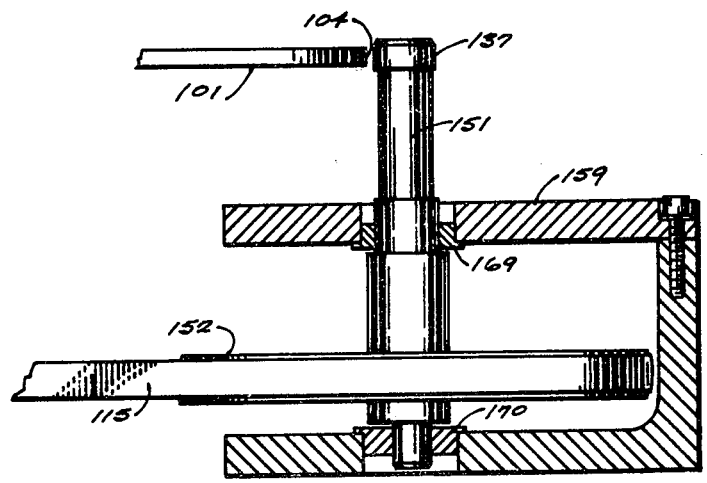
FIG. 7 is an elevation view, partly in section, of the final drive spindle for engaging the rim of a data disk of the structure of FIG. 5.

On FIG. 7 the capstan assembly 159 is shown. The capstan 137 is connected by means of its extension piece 151 to the crowned pulley 152 forming a solid metallic piece which turns freely on bearings 169 and 170. Once again, it was found that solid brass or sintered bronze bearings are the most suitable. On the same figure the belt 115 is also shown which is driven by the previously mentioned driver 117.

Returning now to FIG. 5, the flywheel 131 is as described previously and shown on FIG. 3. However, the motor 120 is directly mounted on plate 154 once again using vibration isolators made from rubber. The first reduction assembly 165 is mounted by means of two screws 163 and 164 which mount the assembly on the mounting plate 154 through the slots 173 and 174 in order to effect adjustment and tensioning of the belts. The tensioning is facilitated by means of the screws 166 and 167, which screws are threaded through the second reduction assembly 159 and bear against the first reduction assembly 165. The pivoting pins 157 and 156 are press fitted on the mounting plate 154 and rotate freely through corresponding holes on the triangular mounting pieces 161 and 162. These triangular mounting pieces mount the complete assembly on the structure plate 123. The top piece 161 bears the weight of the assembly and the lower piece 129 serves only as a guide.

Since the weight of the assembly is considerable a latching mechanism is provided which serves to both hold the capstan away from the disk in a firm manner during the high speed operation so that any accidental movement of the machine will prevent unwanted pivoting motion, and also to permit engagement of the capstan during the slow speed operation. This latching mechanism is composed of two members 147 and 146. The first pivots freely around center 148 and the second pivots freely around the center 150. The first center belongs to anchoring piece 143 and the second to the anchoring piece 145. Anchoring piece 143 is permanently mounted on the structure plate 123. The second anchoring piece 145 is mounted on the assembly plate 154. The other ends of both latching members are held together by pin 149, which in turn is secured by press fit on the fork 142 and rotates freely through the two corresponding holes in the latching members. This fork is retained by the solenoid plunger by means of a long pin 160. This pin, press fitted in the plunger, compresses the return spring 140. During high speed operation, spring 140 pressing against long pin 160 forces the two latching members 147 and 146 to assume a straight line position. This position is adjusted by means of adjustment screw 158 so that the three pivots 148, 149 and 150 are in a straight line and it is this position (i.e., the high speed position) shown in FIG. 5.

It will be evident that any forces due to inertia, or otherwise, cannot force the assembly to pivot and cannot therefore result in accidental engagement of the capstan 137 with the disk's rim 104 because the only way that engagement can be achieved is for the solenoid 139 to be activated and pull the middle pivoting point 149 toward it. It has been found by experience that a force of 8 to 10 pounds between the capstan 137 and the disk's rim 104 is quite adequate. Because of the geometric arrangement of the three pivots, this requires a pulling force of about 4 to 5 pounds on the solenoid plunger at its position of the slow speed operation. Weight 176 is attached firmly on assembly plate 154. This weight 176 is preferably formed of vibration absorbing material such as soft lead, and absorbs the vibrations transmitted by the slow speed motor mounting to the frame of the slow speed mechanism. Solenoid 139 is mounted on the structure plate 123 by means of screws which are not visible in FIG. 5. Once again the axes of belts 119 and 115 are at 90° to each other for the same reason given previously and are arrayed similarly to the diagram shown on FIG. 2.

ELECTRONIC CIRCUITS

Figure 8:
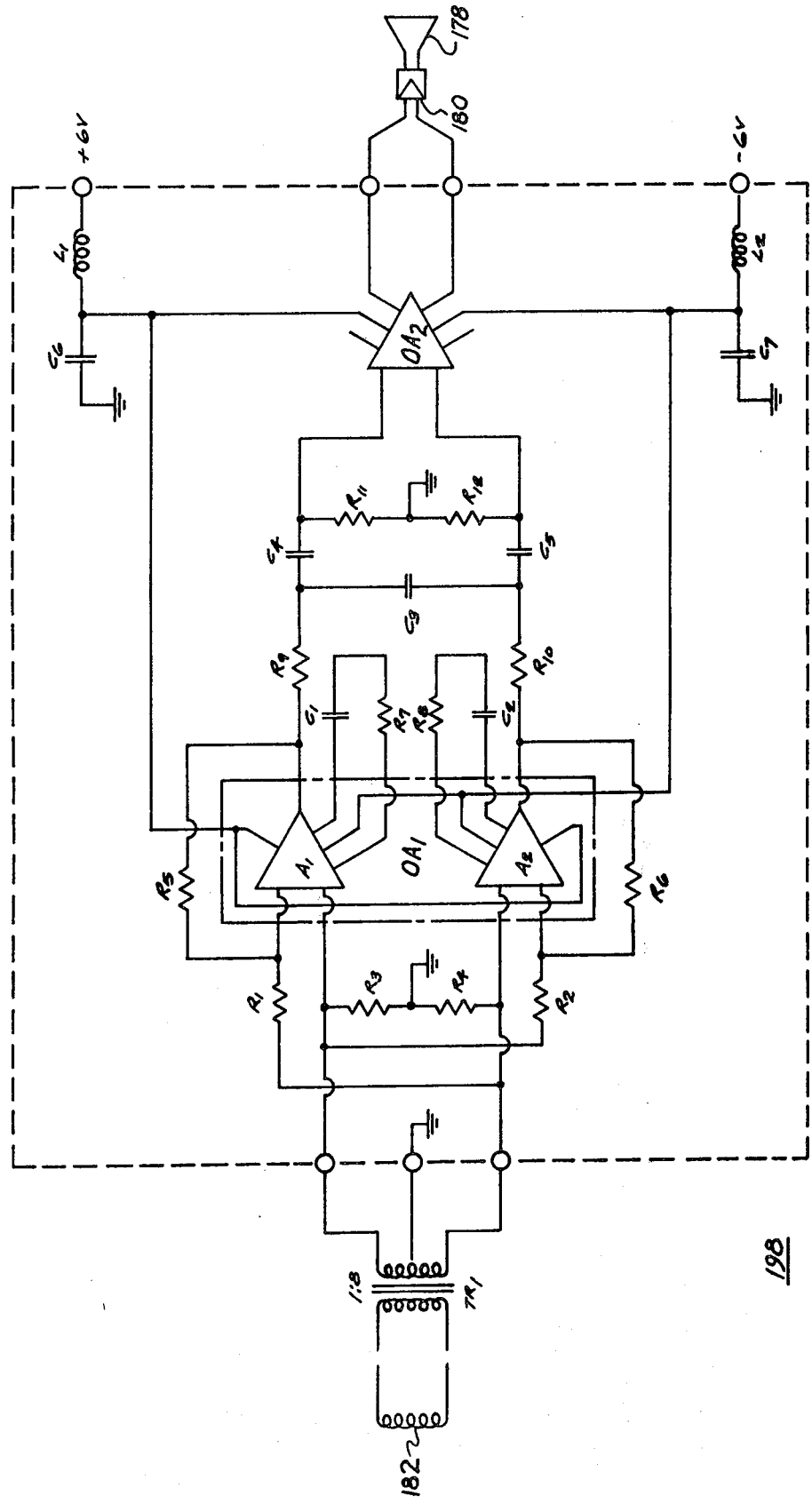
FIG. 8 is a schematic diagram of the slow speed read amplifier forming a part of the invention.

Slow Speed Read Amplifier FIG. 8

The task of reading the disks at slow speed is covered first, before elaborating on coding and decoding means, because it is the most critical. Now, experience of using disks coated with thin magnetic films of such alloys as Ni-Co of approximately 7 $\mu$ in thickness has shown that they are capable of very high resolution of the order of 8,000 saturated magnetic transitions per inch of track. Since for good resolution, the picture must be analyzed to approximately 250,000 elements and since the active display time is about 78% of the total, a track diameter of about 12.8 in or more is required; therefore a disk of 14 in outside diameter was chosen. It was found by experience that when these disks are covered by a thin protective layer of rhodium or other materials, they show insignificant wear at the low speed at which the transducer is in contact. At higher speed, the transducer is automatically lifted from the surface by a distance of 5$\mu$ in − 10$\mu$ in because of dynamic balancing conditions, created by the air continuously expelled from the center to the edge of the disk due to the rotation.

Referring to FIG. 8, a typical version is shown. Transformer $TR_1$ serves to couple the transducer 182 more beneficially to the amplifier by increasing the output voltage. A similar effect could have been obtained by using a separate transducer with more coil turns since at the low speeds the requirements of rapid performance are removed.

However, the high speed transducer is required to act extremely fast during high speed recording and also during high speed reading, and this implies optimization conditions which are not generally ideal for low speed operation. For example, the high speed operation requires a very small number of turns in the transducer coil which produce too low voltage at slow speed. Therefore, with the transformer, the same transducer can be used at both high and low speeds. Referring to FIG. 8, resistance networks $R_1$, $R_5$ and $R_2$, $R_6$ serve to set operational amplifiers $A_1$ and $A_2$ in their proper feedback conditions. Resistors $R_3$ and $R_4$ balance the DC input levels of the two amplifiers, $A_1$ and $A_2$. Capacitor and resistor networks $C_1$, $R_7$ and $C_2$, $R_8$ serve to limit the higher frequency response of amplifiers $A_1$ and $A_2$ to about 30 KHz. On the other hand, networks $R_9$, $C_4$, $R_{10}$, $C_5$, $R_{11}$ and $R_{12}$ serve to limit the lower frequency response to about 1,000 Hz. Capacitor $C_3$ is an additional higher frequency limiting element. Operational amplifier $OA_2$ simply serves to couple the output of the previous amplifiers to the speaker 178 of the acoustic coupler (FIG. 11A).

Networks $L_1$, $C_6$ and $L_2$, $C_7$ act as power supply decouplers, thus removing the influence of any spurious noise.

Encoder FIGS. 9 and 9A

FIG. 9A graphically shows the encoding of the camera signal that takes place in various portions of the circuit of FIG. 9. The signal from the camera 191 of FIG. 11A is an undulating wave A and the object of the circuit is to convert this to a form best suited for recording on a magnetizable medium such as a magnetic storage disk. Such a form is rectangular wave E, wherein the transitions from positive current to a negative current, or vice versa, are sharp and distinct. This enables magnetizing a disk with one polarity corresponding to the low level of waveform E and the opposite polarity corresponding to the high level. This conversion is accomplished by sampling the instantaneous height of the camera signals by a repeating series of ramp voltages B, which in turn produce a number of pulses of a spacing that reflects light intensity at particular picture regions. The waveform D is in essence the inversion of waveform C from which E is generated. The end result is waveform E.

On FIG. 9, the preferred version of the encoder is shown. Inverting amplifier $Q_1$ receives the camera signal and inverts it after a suitable amplification. An emitter follower amplifier $Q_2$ feeds these signals to conventional voltage comparator $OA_1$ which changes its output each time the voltage at input 2 exceeds the voltage at signal input 3. The nature of this comparator is such that the output has two values, high and low, and in fact the output becomes high when the input voltage at terminal 2 exceeds the voltage of terminal 3. The voltage feeding terminal 2 of $OA_1$ is generated by the constant current generator $Q_6$ (lower center of FIG. 9) which, since its base is clamped at constant voltage and strives to maintain approximately the same voltage at its emitter, produces more or less a constant current through its emitter and through its collector terminal. Therefore it charges the capacitor $C_4$ at a constant rate. When comparator $OA_1$ reverses its output, and by means of resister $R_6$ it turns fully on the amplifying transistor $Q_5$, thereby discharging capacitor $C_4$ and thus restarts the ramp. Alternatively, the ramps could be supplied at a constant rate, but the system described gives better utilization of the available disk area.

Inverting amplifiers $G_1$ and $G_2$ serve to stop the operation of flip-flop $FF_1$. The latter receives its input signal from the output of $OA_1$ by means of an emitter follower $Q_3$ and inverter $G_3$. The remainder of the circuitry is quite conventional and familiar to anyone versed in the art of electronic circuitry, and therefore, requires no additional explanation. However, the graphs of FIG. 9A depict the wave forms of the various signals at important points.

Potentiometer $R_3$ adjusts the gain of amplifier $Q_1$. Potentiometer $R_5$ shifts the level for optimum or desired resolution. Potentiometer $R_6$ clips undesired parts of the input wave form, such as excessive synchronizing signals, in order to match the performance and resolution of the disk being used. Finally, potentiometer $R_{12}$ adjusts the rate of sampling by adjusting the slope of the ramp.

Decoder FIGS. 10 and 10A

The decoder 196 is used in the display mode (FIGS. 11A and 11B) and converts the voltage waveform produced by the read amplifier into an undulating wave that is fed to the video monitor 197 to produce a video picture. Referring to FIG. 10A, the top line A, B, D is the waveform from the high speed read amplifier 195 which is derived from the magnetic impressions or transitions on the magnetic storage disk. By referring back to FIG. 9A, the encoded message E will be seen to be identical to the starting waveform A of FIG. 10A. The inverse signal C is generated and ramps are applied to both signal branches as shown at G and H. The ramps are of different height and when these are added, they produce blocks which define an undulating curve at J which is a reproduction of the camera signal A shown in FIG. 9A.

Referring now to FIG. 10, the signal from the high speed read amplifier 195 is applied to the base of amplifier $Q_1$. A balance adjustment consisting of $R_1$ and potentiometer $R_2$ is provided to compensate for any asymmetry produced by the read amplifier. The amplified and inverted signal is clamped by diode $CR_1$ and applied to the base of $Q_2$, which forms an emitter coupled amplifier with $Q_3$. The common emitter current source of $-V_1$ and $R_7$ assures complementary outputs at the collectors of $Q_2$ and $Q_3$. The collector signals are coupled through $R_9$, $C_1$ and $R_{10}$, $C_2$ to amplifiers $Q_4$ and $Q_5$. The positive signal at the collector of $Q_4$ is coupled through $R_{15}$ to the base of $Q_9$. The time constant of $R_{15}$ and $L_1$ is such that $Q_9$ conducts for only a short time. When $Q_9$ conducts, capacitor $C_5$ is discharged to zero voltage.

The positive signal at the collector of $Q_4$ is also coupled through $C_3$ to turn on $Q_6$ causing its collector and the base of $Q_8$ to be at $+V_2$. $Q_8$ is turned on and generates a current at its collector approximately equal to $(+V_1)-(+V_2) / (R_{22}+R_{23})$. $R_{22}$ is made adjustable to compensate for component tolerances. The current from $Q_8$ causes the voltage across $C_5$ to increase in a linear manner. When the signal goes negative at the collector of $Q_4$, it is coupled through $C_3$ to turn off $Q_6$ which turns off $Q_8$ and the current to $C_5$. Since $Q_9$ is unaffected by the negative signal the voltage generated across $C_5$ remains. The voltage generated will therefore be a function of the time between positive and negative transitions of the signal. The identical action is performed by $Q_7$, $Q_{10}$, $Q_{11}$ and $C_6$ which is driven by the complementary signal at $Q_5$. A variable resistor $R_{17}$ is introduced in the drive to $Q_{11}$ to compensate for any difference in conduction time of $Q_9$ and $Q_{11}$ due to component tolerances.

The voltages on $C_5$ and $C_6$ are coupled to $R_{26}$ through a common emitter pair $Q_{12}$ and $Q_{13}$ so that the positive signal voltages will be consecutively combined. The composite signal, decoded video, is amplified by emitter feedback amplifier $Q_{14}$ and the video signal is sent to the monitor. On FIG. 10A the wave forms of various signals are shown.

Figure 12:
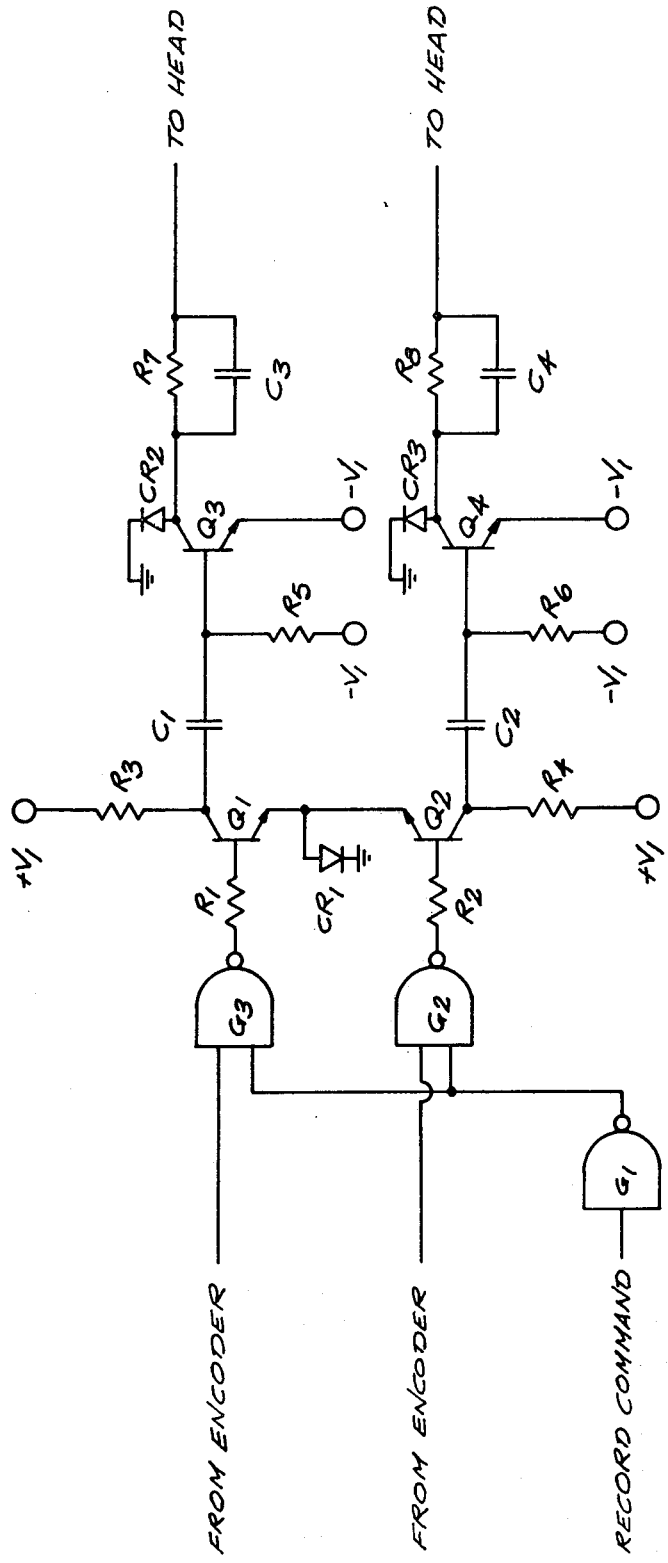
FIG. 12 is a schematic diagram of the write amplifier circuit for both the high speed amplifier and the low speed amplifier, both of which are shown in FIG. 11A and 11B.

Write Amplifier (Slow & High Speed) FIG. 12

The same circuit design is used for the slow speed amplifier 199 and the high speed write amplifier 193. The only difference in construction between the two separate amplifiers is in the size of capacitors $C_1$ and $C_2$.

FIG. 12 shows the write amplifier. The two balanced outputs of the encoder enter gates $G_3$ and $G_2$. The purpose of these gates is twofold: The first is to act as signal reshapers and feed properly the subsequent stages. The other is to provide a gating arrangement so as to permit turning on or off the flow of information by means of the record command line (194 in FIG. 11A). It is this line which in the case of the slow speed write amplifier 199 connects to the record switch 184, FIG. 11A or 11B, and in the case of the high speed write amplifier connects to the record push button 185. Returning now to FIG. 12, transistors $Q_1$ and $Q_2$ act as conventional inverting amplifiers. Diode $CR_1$ serves as a biasing source by virtue of the small voltage drop when current flows through. Transistors $Q_3$ and $Q_4$ are the drivers pumping current either in one direction or the other through the read/write head 182 which should be center tapped to ground. Resistors $R_7$ and $R_8$ limit the current to the desired value since the resistance of the head is only a few ohms. Capacitors $C_3$ and $C_4$ act as speeding elements and compensate to some degree the effect of inductance of the head when current first starts to flow. Diodes $CR_2$ and $CR_3$ limit the voltage appearing on the collectors of the driver transistors, when the current stops flowing alternatively in the two winding parts of the head to a value within their specifications. Transistors $Q_3$ and $Q_4$, being of the NPN type, are in the absence of input signals in the off state. When signals are generated by the encoder, and if the record command is in the grounded level, $Q_3$ and $Q_4$ conduct and thus record. Finally, capacitors $C_1$ and $C_2$ act as couplers. The only difference between the two write amplifiers are these capacitors: The slow speed write amplifier 199 requires large capacitors, and the high speed write amplifier 193 requires small capacitors.

Figure 13:
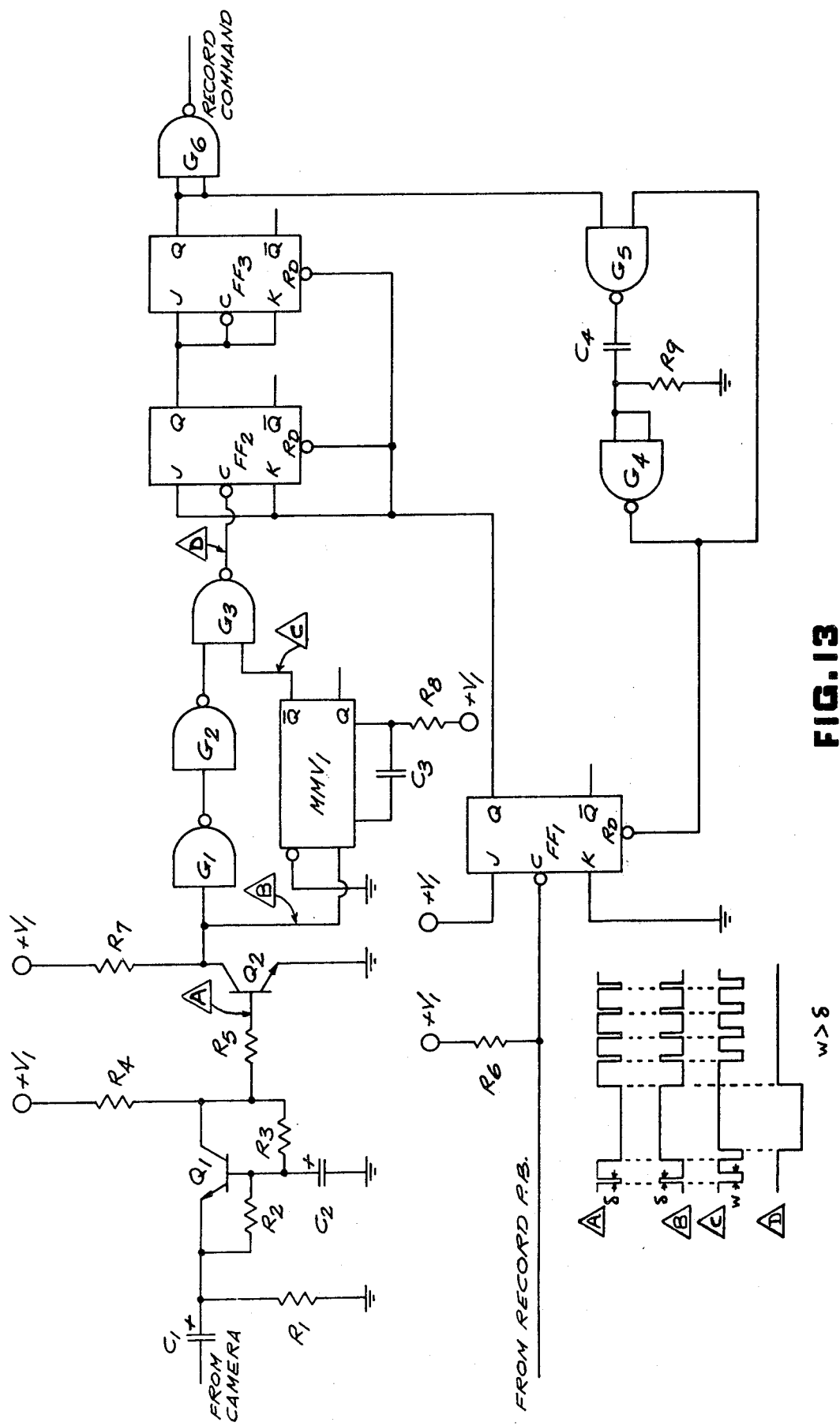
FIG. 13 is a schematic diagram of the circuit for the frame record controller, also indicated by block diagrams in FIGS. 11A and 11B.

Frame Record Controller FIG. 13

FIG. 13 shows the frame record controller. Its purpose is to start the recording at the occurrence of one vertical synchronization signal (denoted often as "sync") and continue it for exactly two fields, or one frame. Each time the record push button 185 is depressed, recording of the encoded video signal begins on the second vertical sync pulse and continues for one frame. The first vertical sync pulse which occurs after the record switch 185 is depressed is not used to start recording due to the danger of improper starting. The frame record controller requires the video input signal from the camera from which the vertical sync pulses are extracted and inputs from the record push button 185. The output from the frame record controller is the command record signal. This is at ground level during the time recording is to take place and at a +4v level at all other times.

Referring to FIG. 13, capacitor $C_1$ serves as a coupling capacitor for the video signal from the camera. Transistor $Q_1$ along with $R_2$, $R_3$, $R_4$, and $C_2$ acts as a sync separator which separates the sync pulses, both horizontal and vertical from the composite video input. Transistor $Q_2$ is an inverter and buffer to supply a proper signal for driving $G_1$ and one shot $MMV_1$. The $\overline{Q}$ output of $MMV_1$ is used as an inhibit input to gate $G_3$. The period of $MMV_1$, which is triggered by the leading edge of each sync pulse, is slightly longer than the width of the horizontal syncs, thereby blocking them from passing through $G_3$. Thus, the output of $G_3$ is the vertical sync pulses which are used as a clock to a four state counter made up of $FF_2$ and $FF_3$. This counter is inhibited from operating by $FF_1$ until $FF_1$ is clocked on by the signal from the record push button 185, at which time the counter completes a four count cycle where the last count re-sets $FF_1$ by means of a one-shot comprised of $G_4$, $G_5$, $R_9$, and $C_4$. The output of $G_6$ is the record command signal which is at ground from the second to the fourth vertical sync pulses of a count cycle.

Figure 14:
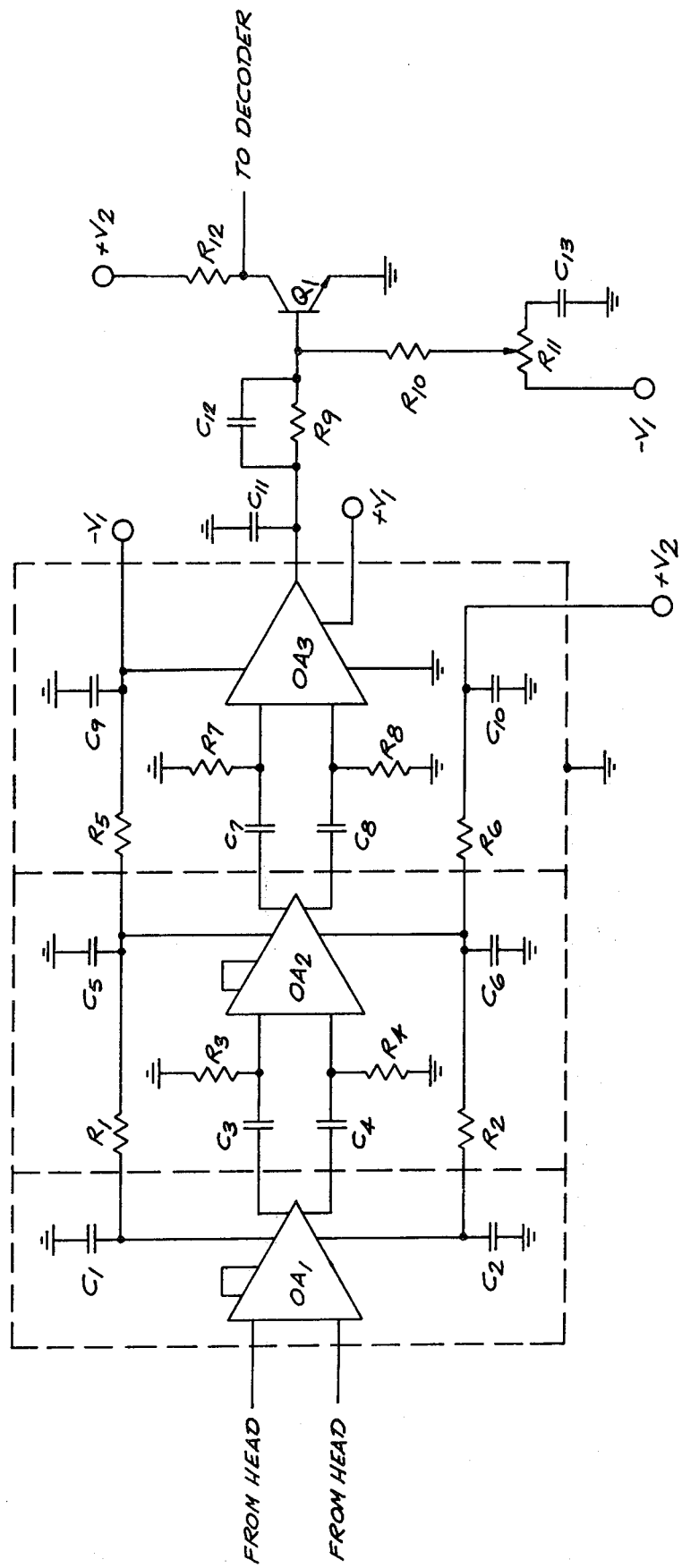
FIG. 14 is a diagram of circuit for the high speed read amplifier shown in block diagram in FIGS. 11A and 11B.
Figure 16:
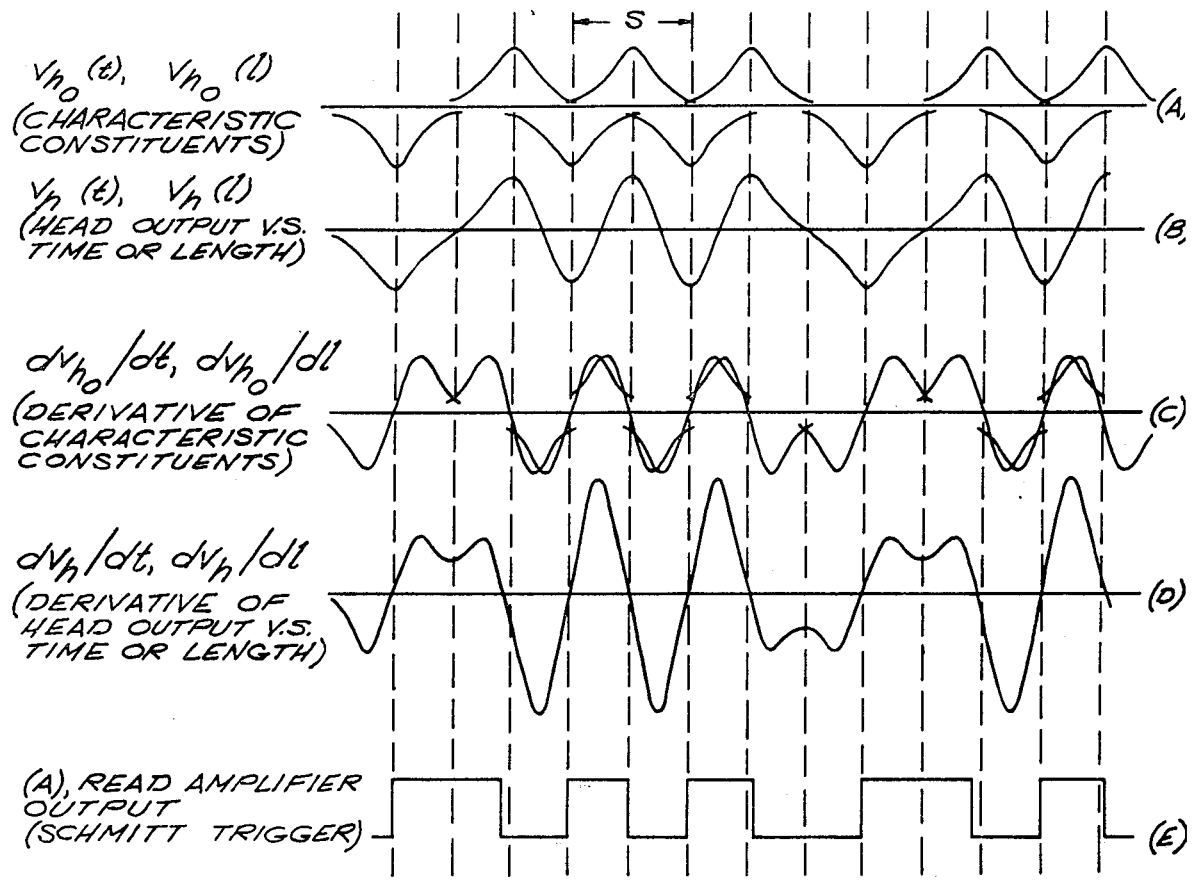

High Speed Read Amplifier FIGS. 14 and 15

The read amplifier 195, FIG. 14, has the task of reproducing in its original form the information recorded on the magnetic layer of the disk. The read head, linking the disk to the read amplifier, responds to a certain extent as a linear transducer and produces a voltage which is proportional to the time derivative of the disk magnetization as it is scanned by the head's centerline:

$$V_h(t) = Kd\phi/dt$$

This expression can also be put in the following form:

$$V_h(t) = Kd\phi/dt = Kd\phi dl/dtdl = Kv_c d\phi/dl = CV_n(l)$$

which means that as the disk passes over the head the latter produces an output which is proportional to both the disk speed and the disk magnetization derivative versus length. Stating the above somewhat differently, since the disk speed is constant, the head output is a continuously changing voltage which starts rising when a magnetic transition just approaches, reaches a maximum when the inflexion point of this transition is over the head, and falls again to zero when the transition leaves the head. Thus, as shown in line A of FIG. 15, every magnetic reversal produces a bell-shaped or cone shaped voltage, positive-going for transitions from negative to positive magnetic saturation, and negative-going for the opposite transitions. Given the linear system, write amplifier-write head-magnetic disk-read head, the response to any one input voltage transition will be a bell-shaped output voltage waveform of constant length S (as measured at the conventional 10 to 10% points), and the response to other transitions is the linear superimposition of individual responses, as in FIG. 15.

Having in the above fashion converted the system into a length domain affair, it will be seen that when considering maximum densities, a first approach would be to arrange the input transitions so that the output bell-shapes occur, at most, end to end; that is, each starts not before the previous one has had time to end. However, in a second approach, if the density were doubled further it would be observed that although there is severe "crowding" at other points, the peaks remain unaltered both in amplitude and in position, since each bell-shape starts not earlier than the peak of the preceding one. In the first approach the maximum density of transitions would be limited to 1/S. In the second approach the density would be 2/S. (In actual practice the density can be increased still further so that in the worst case each bell-shape starts at about λ = S/4 from the beginning of the preceding one. This is so because these shapes approach a Gausssian form and have their ascending and descending inflexion points quite close to their peak, and so they show most of their height near the middle. Thus, the peaks are changed both in amplitude and in position in regions where the magnetization transitions occur; however, the positions are shifted only slightly. The maximum information density in this case 4/S.)

The playback waveform as obtained directly from the read head is not suitable for immediate informtion recovery but must pass through a linear shaping network. The linear shaping network, composed of one R-C section, per leg, converts the playback signal into waveform (D) of FIG. 15. Clipping the signal at both top and bottom close to the base line by means of a Schmitt trigger circuit or voltage comparator provides signal E of FIG. 15, which is the exact reproduction of the write head magnetization current.

Referring to FIG. 14, $OA_1$ and $OA_2$ are differential video amplifiers. $OA_1$ amplifies the signal directly from the head. Capacitor resistor networks $C_3$, $R_3$ and $C_4$, $R_4$ form the derivative of the amplified head output from $OA_1$. This signal is further amplified by $OA_2$. Capacitors $C_7$ and $C_8$ act as coupling capacitors and $R_7$ and $R_8$ are used for impedance matching. $OA_3$ is a high speed comparator which squares up the signal from $OA_2$. Transistor $Q_1$ along with $R_9$, $R_{12}$ and $C_{12}$ is an inverter-buffer stage which along with $C_{11}$, $C_{13}$, $R_{10}$, and $R_{11}$ has symmetry adjusting capabilities which are used to compensate for any asymmetry in $OA_3$ and the threshold of $Q_1$. Networks $C_1$, $R_{11}$, $C_5$, $R_5$, and $C_9$, and $C_2$, $R_2$, $C_6$, $R_6$, and $C_{10}$ act as power supply decouplers, thus removing the influence of any spurious noise.

SUMMARY

It will be appreciated that the described embodiments provide a means for compressing or expanding the time base of electrical signals mechanically, rather than electrically. It is also evident that these compressed or expanded waves can be transmitted over a communication channel that is best adapted for the compressed or expanded wave signal. For example, the original signal may have a long time base and can be recorded slowly and can be transmitted in a brief burst of time by compressing the time base. The interposition of a magnetizable surface and mechanical controls for the relative speeds between a transducer and surface give this ability to compress or expand.

While the presently preferred apparatuus is directed to transmission over telephone lines which have a reliable frequency range of about 2,500 cycles per second, there are available wide band communication channels that extend beyond the audio range and reliably handle up to several mega Hertz. The invention is obviously adaptable for such wide band communication channels and others of higher or lower frequency that may be available in the future.

While conversion (coding) of most signals is probably required to record on a magnetizable surface, certain signals, such as Morse Code, may already be in a form suitable for recording and no coding or decoding is necessary.

Various magnetizable media may be used, including drums, disks and belts, as well as tapes, and optical, mechanical or chemically responsive media may be used. Relative movement between the transducer and the magnetizable medium is all that is required and the medium could be stationary and the transducer could be moving.

Further, by employing moving transducers moving at different rates, the recording and sensing of the recorded signal can take place simultaneously.

Various mechanical controls may be employed and those illustrated are merely the ones presently preferred.

Accordingly, this specification is illustrative and not definitive, and there is included within the scope of the following claim all variations and modifications that come within the true spirit and scope of the invention.

I claim:

1. The method of varying the time scale of an electrical signal comprising:
    a. converting the electrical signal into a form suitable for recording on a magnetizable medium;
    b. transducing the converted electrical signal to record a corresponding series of transitions between two discrete magnetization states on a magnetizable medium;
    c. maintaining a first selected relative velocity between the transducer and the magnetizable medium during recording;
    d. and thereafter reading the recorded transitions on the magnetic medium while maintaining a second selected relative velocity between the transducer and the magnetized medium; whereby the time scale is expanded when the second velocity is less than the first velocity and is compressed when the second velocity is greater than the first velocity.

2. The method of claim 1 wherein the first and second velocities are preselected in a ratio of 2500:1.

3. The method of claim 1 wherein the step of reading the recorded transitions includes using the same transducer used in recording the transitions.

4. The method of claim 1 wherein the reading step includes developing an output electrical signal comprising a series of Gaussian waveforms corresponding respectively to the recorded transitions.

5. The method of claim 4 wherein the first selected relative velocity is greater than the second selected relative velocity and further including the step of applying the output electrical signal to the input of a narrow bandwidth medium for transmission thereby.

6. The method of varying the time scale of an input electrical signal to accommodate communications media of differing bandwidths comprising:
    converting the electrical signal into a series of waveforms of two discrete levels, the lengths of the waveforms corresponding to the amplitudes of the electrical signal at selected points thereof;
    recording the waveforms at a selected high recording velocity as a series of two discrete magnetization states on a magnetizable medium with magnetic transitions between each pair of adjacent states;
    reading the recorded transitions on the magnetic medium while maintaining a selected low reading velocity to develop a readout electrical signal having waveforms corresponding to the reading of said transitions;
    transmitting the readout electrical signal over a transmission medium having a narrow frequency bandwidth;
    recording a series of discrete magnetization states with transitions therebetween in response to the signal received from the transmission medium on a second magnetizable medium at a recording velocity equal to said reading velocity; and thereafter reading the recorded transitions on the second magnetic medium at a reading velocity corresponding to said high recording velocity to develop a reconstituted signal corresponding to the input electrical signal.

7. A system for recording and transmitting electrical signals in different time scales comprising:

a first recorder for recording video signals on a first magnetic medium, the first recorder including means for converting the video signal into a series of waveforms of two discrete levels with lengths corresponding to the amplitudes of the video signal at selected points thereof, means for recording the waveforms on the magnetic medium at a selected high recording velocity as a series of two discrete magnetization states with magnetic transitions between pairs of adjacent states, and means for reading the recorded transitions at a selected low reading velocity to develop a readout electrical signal having waveforms corresponding to said transitions;

means for transmitting the readout electrical signal over a transmission medium of limited frequency bandwidth to a second recorder; and a second recorder remote from the first recorder, the second recorder including means for receiving signals from the transmission medium, means for recording the received signals on a second magnetic medium as a series of discrete magnetization states with transitions therebetween at a recording velocity corresponding to the low reading velocity of the first recorder, means for reading the recorded transitions on the second magnetic medium at a selected high reading velocity, and means for converting the readout from the second magnetic medium to a reconstituted signal corresponding to said video signal.

8. A system in accordance with claim 7 wherein the first and second recorders are alike, the first recorder having the means recited for the second recorder and the second machine having the means recited for the first machine, whereby the two recorders can be used interchangeably.

9. A system in accordance with claim 7 wherein the video signal converting means comprises means for comparing a first waveform including a ramp portion with the video signal waveform, means for terminating the ramp portion when it equals the video signal waveform, and means for generating a second waveform of constant level corresponding in length to the time duration of the first waveform.

10. A system in accordance with claim 7 wherein the readout signal converting means comprises means for generating first and second ramp waveforms, means for comparing the ramp waveforms with respective portions of the readout from the second magnetic medium to develop a pair of waveforms having signal levels corresponding to the recorded transitions thereon, and means for combining said pair of waveforms to provide said reconstituted signal.

* * * * *